United States Patent
Son et al.

(10) Patent No.: US 10,823,298 B2
(45) Date of Patent: Nov. 3, 2020

(54) WARM WATER RECIRCULATING VALVE USING DIRECT WATER SUPPLY TUBE

(71) Applicant: KYUNGDONG NAVIEN CO., LTD., Pyeongtaek-si, Gyeonggi-do (KR)

(72) Inventors: Seung Kil Son, Seoul (KR); Jae Myung Joo, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 0 days.

(21) Appl. No.: 16/320,033

(22) PCT Filed: Jul. 25, 2017

(86) PCT No.: PCT/KR2017/008009
§ 371 (c)(1),
(2) Date: Jan. 23, 2019

(87) PCT Pub. No.: WO2018/021804
PCT Pub. Date: Feb. 1, 2018

(65) Prior Publication Data
US 2019/0249785 A1     Aug. 15, 2019

(30) Foreign Application Priority Data
Jul. 29, 2016   (KR) ........................ 10-2016-0097201

(51) Int. Cl.
*F16K 11/20*      (2006.01)
*F16K 11/04*      (2006.01)
(Continued)

(52) U.S. Cl.
CPC ................ *F16K 11/04* (2013.01); *F16K 1/34* (2013.01); *F16K 1/36* (2013.01); *F16K 27/02* (2013.01);
(Continued)

(58) Field of Classification Search
CPC .... F16K 11/04; F16K 31/1221; F16K 31/223; G05D 23/12; F24H 9/2007; E03B 7/045
See application file for complete search history.

(56) References Cited

U.S. PATENT DOCUMENTS 3,805,836 A * 4/1974 Veale ...................... F16K 11/07
137/625.4
5,503,183 A * 4/1996 Fenn ................... G05D 23/1393
137/495

(Continued)

FOREIGN PATENT DOCUMENTS

JP       2015-25602 A    2/2015
KR  20-1999-0029423 U    7/1999
(Continued)

*Primary Examiner* — Reinaldo Sanchez-Medina
(74) *Attorney, Agent, or Firm* — Stein IP, LLC

(57) ABSTRACT

The present invention relates to a warm water recirculating valve using a direct water supply tube and, more particularly, to a warm water recirculating valve provided between a warm water supply tube (13) installed in an existing housing and a direct water supply tube (14) in order to recirculate warm water, the warm water recirculating valve comprising: a housing (110) having warm water channels (111, 112) formed therein and connected to the warm water supply tube (13), having direct water channels (114, 115, 116) formed therein and connected to the direct water supply tube (14), and having a recirculating channel (113) formed therein and connected between the warm water channels (111, 112) and the direct water channels (114, 115, 116); and a water pressure plate (140) provided in the direct water channels (114, 115, 116) so as to generate a differential pressure such that, when warm water is recirculated, the recirculating channel (113) is opened by pressure of the recirculated warm water and, when direct water is used, the recirculating channel (113) is closed by pressure of the direct water.

9 Claims, 5 Drawing Sheets

(51) Int. Cl.
*F16K 31/12* (2006.01)
*F16K 1/36* (2006.01)
*F24H 9/20* (2006.01)
*F16K 1/34* (2006.01)
*F16K 27/02* (2006.01)
*F16K 31/122* (2006.01)

(52) U.S. Cl.
CPC .......... *F16K 31/12* (2013.01); *F16K 31/1221* (2013.01); *F16K 31/1226* (2013.01); *F24H 9/20* (2013.01)

(56) References Cited

U.S. PATENT DOCUMENTS

| | | | |
|---|---|---|---|
| 5,983,922 A * | 11/1999 | Laing | F04D 13/14 137/337 |
| 7,971,601 B2 * | 7/2011 | Lum | F16K 31/002 137/337 |
| 2003/0140966 A1 * | 7/2003 | Kempf | E03B 7/045 137/337 |
| 2007/0114290 A1 * | 5/2007 | Kempf | G05D 23/022 236/12.13 |
| 2007/0137709 A1 * | 6/2007 | Kempf | E03B 7/09 137/337 |
| 2008/0105305 A1 * | 5/2008 | Lum | E03B 7/04 137/337 |
| 2009/0007972 A1 | 1/2009 | Lum et al. | 137/468 |
| 2011/0214767 A1 | 9/2011 | Laing | 137/625.4 |
| 2013/0240053 A1 | 9/2013 | Lum et al. | 137/115.01 |

FOREIGN PATENT DOCUMENTS

KR 10-2004-0067525 A 7/2004
WO WO 2016/040849 A1 3/2016

* cited by examiner

WARM WATER RECIRCULATING VALVE USING DIRECT WATER SUPPLY TUBE

CROSS-REFERENCE TO RELATED APPLICATIONS

This application is a national stage of International Application No. PCT/KR2017/008009, filed Jul. 25, 2017, which claims the benefit of priority of Korean Application No. 10-2016-0097201, filed Jul. 29, 2016, in the Korean Intellectual Property Office, the disclosures of which are incorporated herein by reference.

TECHNICAL FIELD

The present invention relates to a warm water recirculating valve applied to a system using a direct water supply tube to recirculate warm water because a warm water recirculating pipe is not installed, and more specifically, to a warm water recirculating valve using a direct water supply tube in which a configuration of warm water recirculating valve provided between a warm water supply tube and a direct water supply tube to recirculate warm water is simplified.

BACKGROUND ART

Generally, in order to use warm water, cold water which is present from a boiler or a water heater to a faucet and water which is not heated to a sufficient temperature should be drained.

A recirculation system developed to save the water drained like the above includes a system for expansion which requires a separate recirculating pipe in addition to a direct water pipe and a warm water pipe and a warm water recirculation system using a direct water supply tube configured to recirculate and preheat warm water using a recirculating valve and a recirculating pump between a warm water pipe and a direct water pipe which are already installed.

An electrically operating valve or a valve configured to operate using a thermostatic material such as thermal wax or bimetal is applied to a warm water recirculation system using a direct water supply tube according to the related art.

As an example of the warm water recirculation system using a direct water supply tube according to the related art, a configuration of a recirculating valve configured to allow warm water to bypass without using electricity is disclosed in International Patent Laid-Open WO2016/040849. The recirculating valve disclosed in the International Patent Laid-Open is formed of a bimetal valve opened at a temperature lower than or equal to a certain temperature and closed at a temperature greater than or equal to a certain temperature and a check valve configured to provide a directionality so that the direct water cannot flow to the warm water, and since the configuration is complicated, the number of manufacturing processes is excessive and a great deal of material costs are consumed. Further, since the warm water is recirculated through a narrow gap of the bimetal valve opened at the temperature lower than or equal to the set temperature, a flow rate of the circulating water is small and thus a preheating time of the warm water becomes longer.

Meanwhile, in the warm water recirculation system using a direct water supply tube according to the related art, the recirculating valve is opened at the temperature lower than or equal to a certain temperature and the recirculating pump is also operated at a temperature lower than or equal to a certain temperature. However, since a space in which the recirculating valve is installed and a space in which the recirculating pump is installed are physically separated from each other, a temperature sensed at the recirculating valve and a temperature sensed at the recirculating pump may be different from each other. As described above, since feedback between the recirculating valve and the recirculating pump is not smoothly performed when the temperatures are different from each other, even when the temperature sensed at the recirculating valve already reaches a set preheating temperature, the recirculating pump may be continuously operated in the case in which the temperature sensed at the recirculating pump is lower than the set preheating temperature. In this case, since the recirculating pump is operated, it is difficult to precisely match the set preheating temperature and power is unnecessarily consumed.

Further, in the warm water recirculation system using a direct water supply tube according to the related art, since a general check valve is used, the recirculated warm water is mixed with the direct water and supplied to a user when the direct water is used during recirculation of the warm water, and accordingly, cold direct water desired by the user cannot be used.

DISCLOSURE

Technical Problem

The present invention is directed to providing a warm water recirculating valve using a direct water supply tube configured to simplify a configuration of the warm water recirculating valve applied to a warm water recirculation system using a direct water supply tube and increase a flow rate of warm water which is recirculated, and configured to quickly prevent mixing of the warm water with direct water and then drainage of the water when the direct water is used during recirculation of the warm water.

Technical Solution

One aspect of the present invention provides a warm water recirculating valve (100) using a direct water supply tube, which is a warm water recirculating valve provided between a warm water supply tube (13) and a direct water supply tube (14) installed in an existing house to recirculate warm water, the warm water recirculating valve including a housing (110) in which warm water channels (111, 112) connected to the warm water supply tube (13), direct water channels (114, 115, 116) connected to the direct water supply tube (14), and a recirculating channel (113) connected between the warm water channels (111, 112) and the direct water channels (114, 115, 116) are formed and a water pressure plate (140) provided in the direct water channels (114, 115, 116) to generate a differential pressure so that the recirculating channel (113) is opened by a pressure of warm water which is recirculated when the warm water is recirculated and the recirculating channel (113) is closed by a pressure of direct water when the direct water is used.

The warm water recirculating valve may further include a valve body (120) configured to reciprocate integrally with the water pressure plate (140) to open and close one side end of the recirculating channel (113) and an elastic member (170) configured to elastically support the water pressure plate (140) so that the valve body (120) comes into close contact with the one side end of the recirculating channel (113).

Spaces (G1, G2) which are spaced apart from each other so that a fluid is movable may be provided between outer surfaces of the valve body (120) and the water pressure plate (140) and an inner surface of the housing (110) in which the direct water channels (114, 115, 116) are formed.

A flow space (G3) may be formed at the water pressure plate (140) so that the direct water or the warm water may flow in a frontward direction and a backward direction on the basis of the water pressure plate (140) and a diaphragm (180) may be connected and installed between an outer end of the water pressure plate (140) and an inner side surface of the housing (110).

The valve body (120) and the water pressure plate (140) may be connected to each other by a shaft (130) having a diameter smaller than a diameter of each of the valve body (120) and the water pressure plate (140), and the connection channel (115) may be formed on the outside of the shaft (130) which is a space between the valve body (120) and the water pressure plate (140).

A pressure (P3) in the recirculating channel (113) may be formed to be greater than a pressure (P2) in the connection channel (115) when the warm water is recirculated, and thus the recirculating channel (113) may be opened.

A pressure (P1) of the direct water which acts on a rear end surface of the water pressure plate (140) may be formed to be greater than the pressure (P2) in the connection channel (115) when the warm water or the direct water is used, and thus the recirculating channel (113) may be closed.

One side end of the elastic member (170) may be supported by a moving body (150) elongated in a backward direction from the water pressure plate (140) and the other side end of the elastic member (170) may be supported by a fixing body (160) separated from the moving body (150) and coupled to the inside of the housing (110).

The water pressure plate (140) may be formed in a flange shape protruding to the outside of the moving body (150).

An opening part (118) may be formed in one side of the housing (110) so that the valve body (120), the shaft (130), the water pressure plate (140), the moving body (150), the fixing body (160), and the elastic member (170) may be inserted into the housing (110).

Advantageous Effects

In a warm water recirculating valve using a direct water supply tube according to the present invention, since a water pressure plate is provided in direct water channels, a recirculating channel can be opened by a pressure of warm water which is recirculated when the warm water is recirculated, and since a differential pressure is generated so that a recirculating channel is closed by a pressure of direct water when the direct water is used, the configuration of a warm water recirculating valve can be simplified, and the number of manufacturing processes and material costs can be reduced.

Further, since a valve body is spaced apart from one side end of the recirculating channel by a sufficient interval when the warm water is recirculated, a flow rate of the warm water which is recirculated can be increased in comparison with a warm water recirculating valve according to the related art so as to reduce a preheating time of the warm water.

In addition, since the valve body quickly closes the recirculating channel due to the differential pressure which acts on the front and rear sides of the water pressure plate even when the direct water is used during recirculation of the warm water, a problem in which the warm water is mixed with the direct water and supplied to a user can be prevented.

In addition, in the related art, a recirculating pump is operated, and thus it is difficult to precisely match a set preheating temperature and power is consumed even when a temperature of the warm water recirculating valve and a temperature of the recirculating pump are different. However, according to the present invention, since the recirculating channel is opened and the warm water is recirculated only when the recirculating pump is operated and the recirculating channel is closed to stop the recirculation of the warm water when the recirculating pump stops operating, water can be preheated according to the set preheating temperature, and unnecessary power consumption can be prevented.

Figure 1:
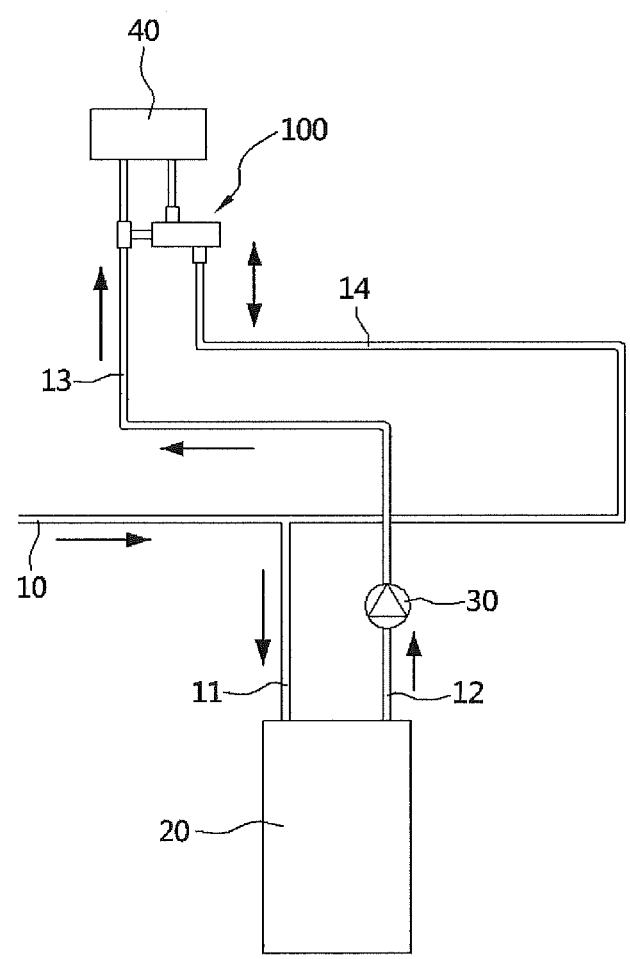
FIG. 1 is a configuration view of a warm water recirculation system to which a warm water recirculating valve using a direct water supply tube according to the present invention is applied.

| Reference numerals | |
|---|---|
| 10: direct water tube | 11: direct water introduction tube |
| 12: warm water drain tube | 13: warm water supply tube |
| 14: direct water supply tube | 20: warm water tank |
| 30: recirculating pump | 40: faucet |
| 100: warm water recirculating valve | 110: housing |
| 111: warm water introduction channel | 112: warm water drain channel |
| 113: recirculating channel | 114: direct water introduction channel |
| 115: connection channel | 116: direct water drain channel |
| 117: valve sheet | 118: opening part |
| 120: valve body | 130: shaft |
| 140: water pressure plate | 150: moving body |
| 160: fixing body | 161: O-ring |
| 170: elastic member | 180: diaphragm |

MODES OF THE INVENTION

Hereinafter, a configuration and an action of an embodiment of the present invention will be described in detail with reference to the accompanying drawings.

FIG. 1 is a configuration view of a warm water recirculation system to which a warm water recirculating valve using a direct water supply tube according to the present invention is applied.

A warm water recirculation system to which the present invention is applied includes a direct water introduction tube 11 branched from a direct water tube 10, a warm water tank 20 configured to heat direct water which is introduced through the direct water introduction tube 11 to generate warm water, a warm water drain tube 12 through which the warm water heated from the warm water tank 20 is drained, a recirculating pump 30 configured to transfer the warm water which passes through the warm water drain tube 12 so that the warm water is recirculated, a warm water supply tube 13 connected to an outlet of the recirculating pump 30 and configured to supply the warm water to a warm water drain port (not shown) of a faucet 40, a direct water supply tube 14 connected to the direct water tube 10 and configured to supply the direct water to a direct water drain port (not shown) of the faucet 40, and a warm water recirculating valve 100 provided between the warm water supply tube 13 and the direct water supply tube 14 to recirculate the warm water.

The warm water recirculating valve 100 may be additionally installed between the warm water supply tube 13 and the direct water supply tube 14, which are already installed in an existing house to recirculate the warm water, and serves to recirculate the warm water by preventing a flow of a fluid between the warm water supply tube 13 and the direct water supply tube 14 when the warm water or the direct water is used and allowing the fluid to flow in only one direction from the warm water supply tube 13 to the direct water supply tube 14 so that the direct water is preheated to a set temperature when both the warm water and the direct water are not used.

Hereinafter, a configuration and action of a warm water recirculating valve 100 according to a first embodiment of the present invention will be described.

Figure 2:
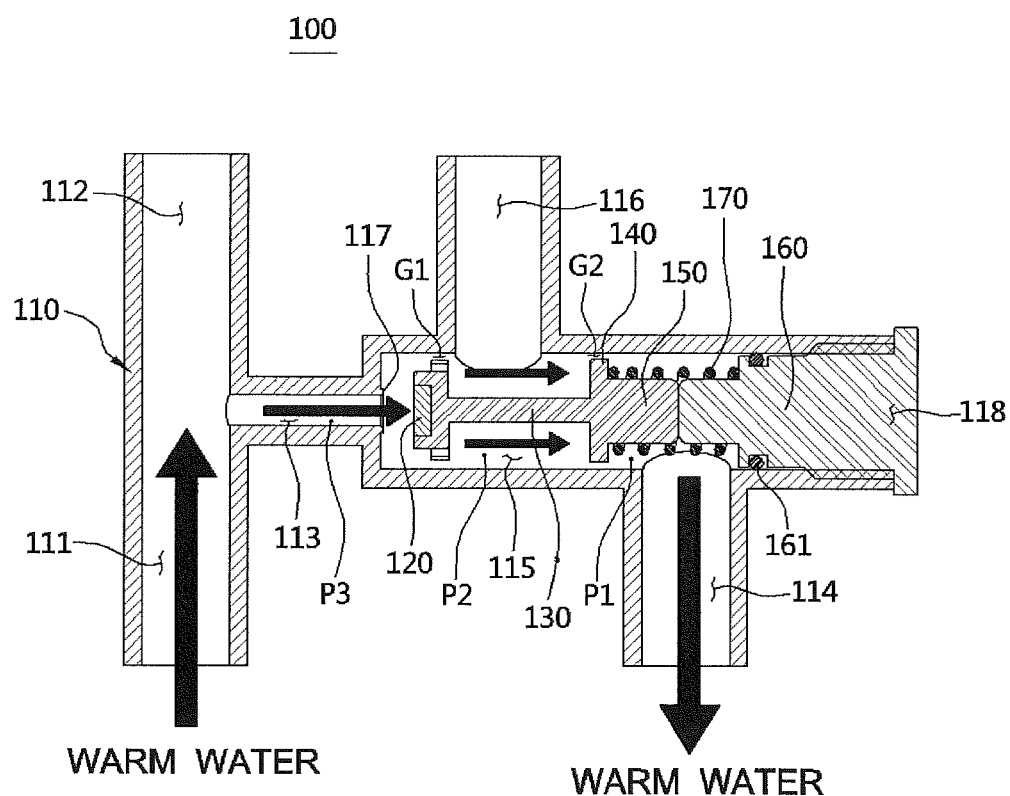
FIG. 2 is an operation state view illustrating a state in which a warm water recirculating valve using a direct water supply tube according to a first embodiment of the present invention is opened.
Figure 3:
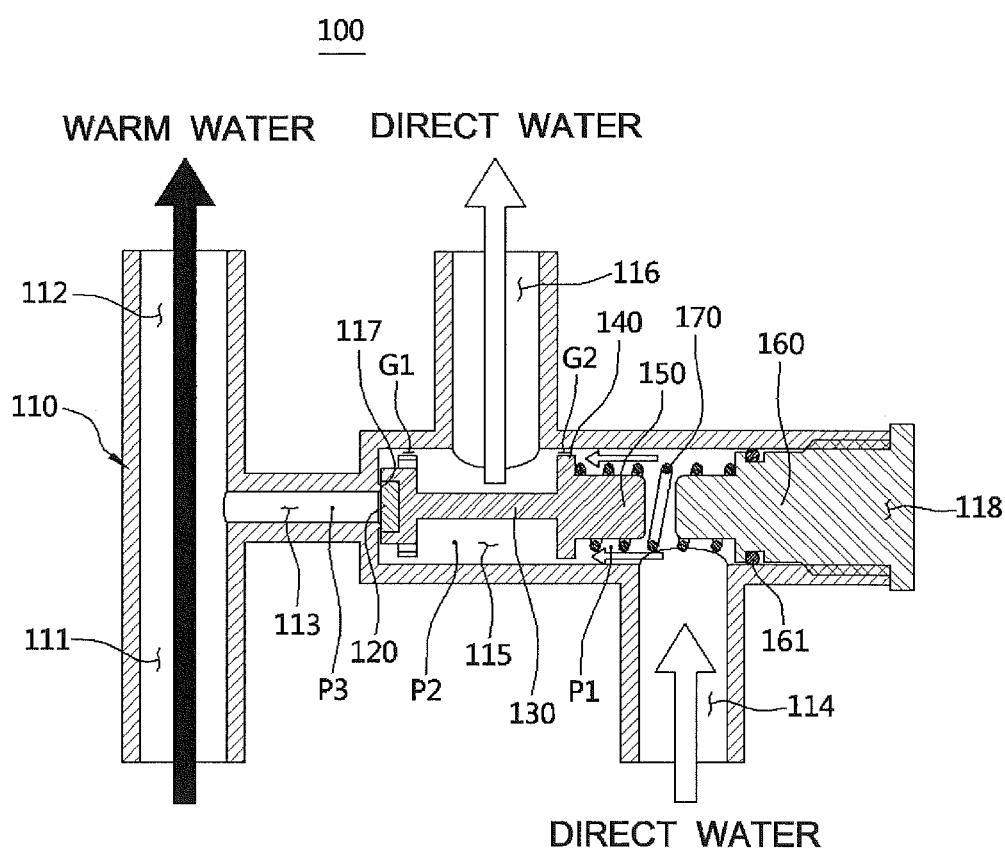
FIG. 3 is an operation state view illustrating a state in which the warm water recirculating valve using a direct water supply tube according to the first embodiment of the present invention is closed.

FIG. 2 is an operation state view illustrating a state in which the warm water recirculating valve using a direct water supply tube according to the first embodiment of the present invention is opened, and FIG. 3 is an operation state view illustrating a state in which the warm water recirculating valve using a direct water supply tube according to the first embodiment of the present invention is closed. Arrows shown in FIGS. 2 and 3 show a flow direction of each of warm water and direct water.

The warm water recirculating valve 100 according to the present invention includes a housing 110 connected and installed between the warm water supply tube 13 and the direct water supply tube 14 and components provided in the housing 110 to check whether the warm water is recirculated using a differential pressure.

Warm water channels 111 and 112 connected to the warm water supply tube 13, direct water channels 114, 115, and 116 connected to the direct water supply tube 14, and a recirculating channel 113 connected between the warm water channels 111 and 112 and the direct water channels 114, 115, and 116 to provide a channel through which the warm water is circulated are formed in the housing 110.

The warm water channels 111 and 112 include a warm water introduction channel 111 connected to the warm water supply tube 13 and into which the warm water is introduced and a warm water drain channel 112 configured to supply the warm water introduced through the warm water introduction channel 111 to a warm water drain port (not shown) of a faucet 40.

The recirculating channel 113 is branched to one side from the warm water channels 111 and 112 and communicates with the direct water channels 114, 115, and 116 to provide the channel so that the warm water which passes through the warm water channels 111 and 112 flows to the direct water channels 114, 115, and 116 when the warm water is recirculated.

The direct water channels 114, 115, and 116 include a direct water introduction channel 114 connected to the direct water supply tube 14 and into which the direct water is introduced, a connection channel 115 configured to communicate with the direct water introduction channel 114, and a direct water drain channel 116 configured to supply the direct water which passes through the connection channel 115 to a direct water drain port (not shown) of the faucet 40.

The direct water channels 114, 115, and 116 include a valve body 120 configured to come into contact with a valve sheet 117 formed at one side end of the recirculating channel 113 or spaced apart from the valve sheet 117 to open and close the recirculating channel 113, a shaft 130 elongated in a backward direction from a rear end surface of the valve body 120, a water pressure plate 140 integrally formed with a rear end of the shaft 130, a moving body 150 elongated in a backward direction from the water pressure plate 140, an elastic member 170 having one side end supported by the water pressure plate 140 and the moving body 150, and a fixing body 160 separated from the moving body 150, coupled to the inside of the housing 110, and on which the other side end of the elastic member 170 is supported.

Spaces G1 and G2 which are spaced apart from each other so that a fluid is movable are provided between outer surfaces of the valve body 120 and the water pressure plate 140 and an inner surface of the housing 110 in which the connection channel 115 is formed. Further, the valve body 120 and the water pressure plate 140 are connected to each other by the shaft 130 having a diameter smaller than a diameter of each of the valve body 120 and the water pressure plate 140, and the connection channel 115 is formed on the outside of the shaft 130 which is a space between the valve body 120 and the water pressure plate 140.

Since the water pressure plate 140 is formed in a flange shape protruding to the outside of the moving body 150, when the direct water is used, a pressure of the direct water which is introduced through the direct water introduction channel 114 presses the water pressure plate 140 in a direction in which the direct water flows, and simultaneously acts so that the valve body 120 connected to the water pressure plate 140 by the shaft 130 comes into contact with the valve sheet 117.

The elastic member 170 elastically supports the water pressure plate 140 and provides an elastic force so that the valve body 120 connected to the water pressure plate 140 by the shaft 130 comes into contact with the valve sheet 117.

Meanwhile, an opening part 118 is formed in one side of the housing 110 so that the valve body 120, the shaft 130, the water pressure plate 140, the moving body 150, the fixing body 160, and the elastic member 170 may be inserted into the housing 110. Further, an O-ring 161 is coupled to an outer circumferential surface of the fixing body 160 to maintain airtightness with an inner surface of the housing 110. Accordingly, since assembly of the warm water recirculating valve 100 is completed by only a process of inserting the valve body 120, the shaft 130, the water pressure plate 140, the moving body 150, the fixing body 160, and the elastic member 170 into the housing 110 through the opening part 118, a process of manufacturing the warm water recirculating valve 100 may be simplified.

Referring to FIG. 2, when the warm water is recirculated, since a recirculating pump 30 is operated and a pressure P3 in the recirculating channel 113 is formed to be greater than a pressure P2 in the connection channel 115, the valve body 120 is pushed in a direction in which the warm water flows and thus the recirculating channel 113 is opened.

In this case, since the valve body 120 is spaced apart from the valve sheet 117 formed at the one side end of the recirculating channel 113 in a backward direction with a sufficient interval and the warm water passes through the spaces G1 and G2 and the connection channel 115 to be recirculated, a flow rate of the warm water which is recirculated may be increased in comparison with a warm water recirculating valve according to the related art so as to reduce a preheating time of the warm water.

Referring to FIG. 3, since a pressure P1 of the direct water which acts on a rear end surface of the water pressure plate 140 is formed to be greater than a pressure P2 in the connection channel 115 when the warm water or the direct water is used, especially when the direct water is used during recirculation of the warm water, the water pressure plate 140 and the valve body 120 are pushed in a direction in which the direct water flows and the valve body 120 comes into close contact with the valve sheet 117. Accordingly, the recirculating channel 113 is closed.

As described above, since the recirculating channel 113 is quickly closed using a differential pressure (P1-P2) of pressures which act on the front and rear sides of the water pressure plate 140 when the direct water is used, a problem, in which the warm water is mixed with the direct water and supplied, may be prevented when a user desires to use the direct water.

Further, in the related art, there is a problem that the recirculating pump is operated and it is difficult to precisely match a set preheating temperature, and power is consumed even when a temperature of the warm water recirculating valve and a temperature of the recirculating pump are different. However, according to the present invention, since the recirculating channel 113 is opened and the warm water is recirculated only when the recirculating pump 30 is operated and the recirculating channel 113 is quickly closed to stop the recirculation of the warm water when the recirculating pump 30 stops operating, water may be preheated according to a set preheating temperature and unnecessary power consumption may be prevented.

Figure 4:
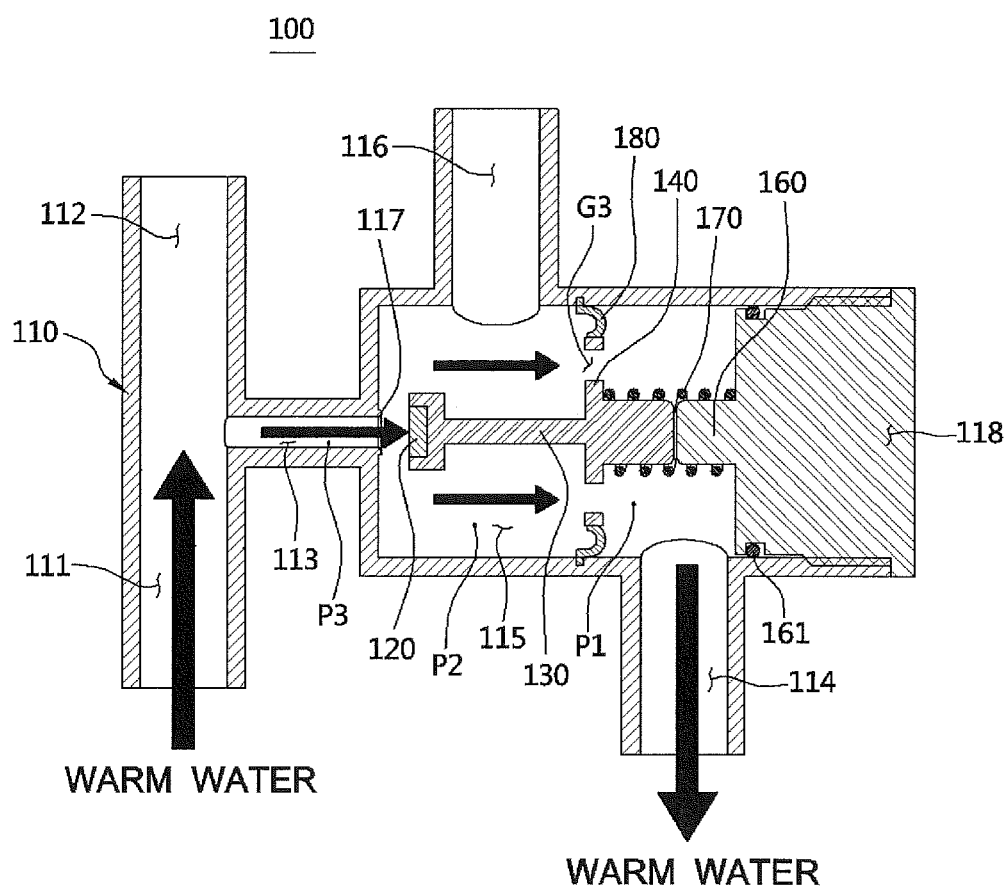
FIG. 4 is an operation state view illustrating a state in which a warm water recirculating valve using a direct water supply tube according to a second embodiment of the present invention is opened.
Figure 5:
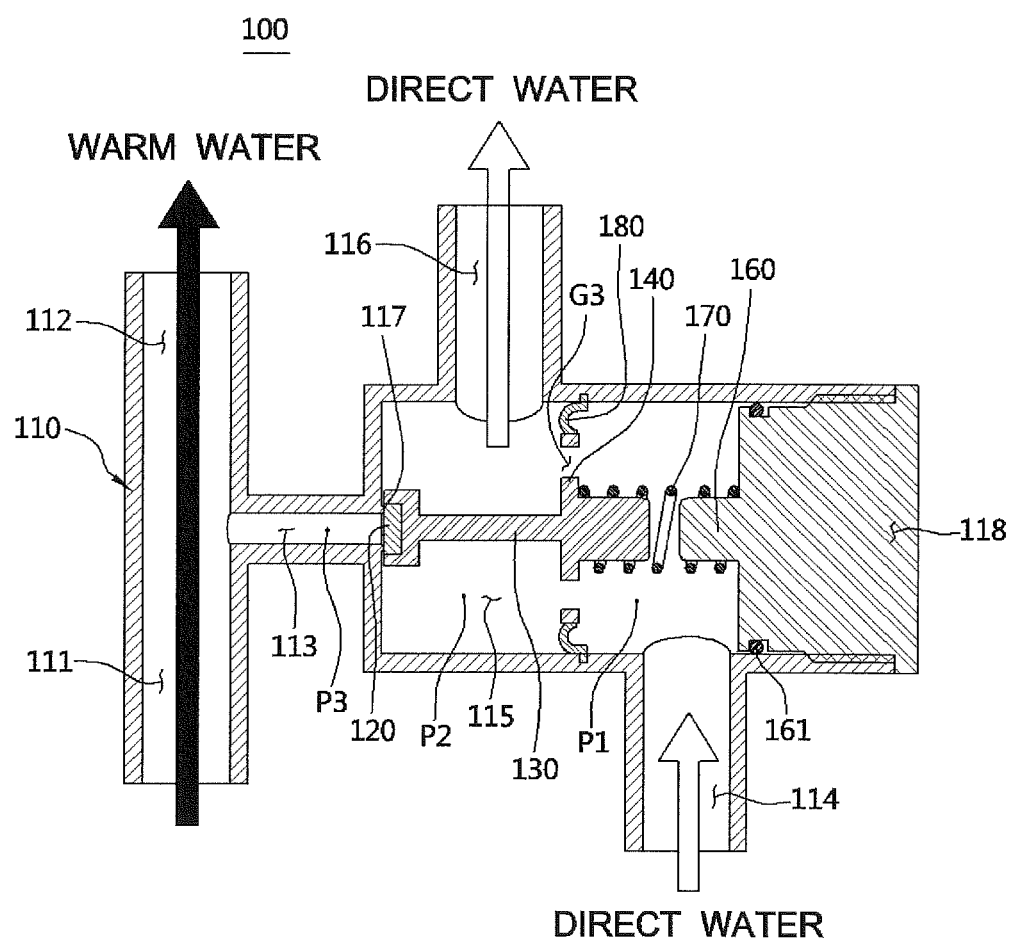
FIG. 5 is an operation state view illustrating a state in which the warm water recirculating valve using a direct water supply tube according to the second embodiment of the present invention is closed.

FIG. 4 is an operation state view illustrating a state in which a warm water recirculating valve using a direct water supply tube according to a second embodiment of the present invention is opened, and FIG. 5 is an operation state view illustrating a state in which the warm water recirculating valve using a direct water supply tube according to the second embodiment of the present invention is closed.

A warm water recirculating valve using a direct water supply tube 100 according to the second embodiment of the present invention is a warm water recirculating valve in which some of configurations of the above-described embodiment are modified, wherein a flow space G3 is formed at a water pressure plate 140 so that direct water or warm water flows in a frontward direction and a backward direction on the basis of the water pressure plate 140, a diaphragm 180 is connected and installed between an outer end of the water pressure plate 140 and an inner side surface of the housing 110, and other configurations and actions may be applied in the same manner as those of the above-described first embodiment.

The diaphragm 180 has both ends fixed to the outer end of the water pressure plate 140 and the inner side surface of the housing 110 to be elastically transformable by a differential pressure between the front and rear sides of the water pressure plate 140.

According to configurations of the embodiment, since the water pressure plate 140 is formed in a structure connected by the diaphragm 180, the water pressure plate 140 may be stably supported and a cross-sectional area of the connection channel 115 may be more widely secured in comparison with the above-described embodiment. Accordingly, a flow rate of the warm water which is recirculated may be further increased to reduce a preheating time of the warm water.

The present invention may be applied to and embodied in not only the warm water recirculation system using a direct water supply tube but also a warm water recirculation system for an existing structure installed between a warm water supply tube and a direct water supply tube already installed in an existing house.

As described above, the present invention is not limited to the above-described embodiment, and it will be apparent to those skilled in the art that the present invention may be modified without departing from the spirit of the present invention in the claims and that the modification is included in the scope of the present invention.

The invention claimed is:

1. A warm water recirculating valve provided between a warm water supply tube (13) and a direct water supply tube (14) to recirculate warm water, the warm water recirculating valve comprising: a housing (110), a valve body (120) and a water pressure plate (140), wherein:
the housing (110) includes warm water channels (111, 112) connected to the warm water supply tube (13), direct water channels (114, 115, 116) connected to the direct water supply tube (14), and a recirculating channel (113) connected between the warm water channels (111, 112) and the direct water channels (114, 115, 116);
the valve body (120) and the water pressure plate (140) are provided in the direct water channels (114, 115, 116);
the valve body (120) and the water pressure plate (140) are connected to each other by a shaft (130) having a diameter smaller than a diameter of any of the valve body (120) and the water pressure plate (140);
a connection channel (115) is formed on the outside of the shaft (130) which is a space between the valve body (120) and the water pressure plate (140);
the valve body (120) and the water pressure plate (140) reciprocate integrally to open and close one side end of the recirculating channel (113); and
the recirculating channel (113) is opened by a pressure of warm water which is recirculated when the warm water is recirculated and the recirculating channel (113) is closed by a pressure of direct water when the direct water is used.

2. The warm water recirculating valve of claim 1, further comprising:
an elastic member (170) configured to elastically support the water pressure plate (140) so that the valve body (120) comes into close contact with the one side end of the recirculating channel (113).

3. The warm water recirculating valve of claim 2, wherein spaces (G1, G2) which are spaced apart from each other so that a fluid is movable are provided between outer surfaces of the valve body (120) and the water pressure plate (140) and an inner surface of the housing (110) in which the direct water channels (114, 115, 116) are formed.

4. The warm water recirculating valve of claim 2, wherein:
a flow space (G3) is formed at the water pressure plate (140) so that the direct water or the warm water flows in a frontward direction and a backward direction on the basis of the water pressure plate (140); and
a diaphragm (180) is connected and installed between an outer end of the water pressure plate (140) and an inner side surface of the housing (110).

5. The warm water recirculating valve of claim 2, wherein: one side end of the elastic member (170) is supported by a moving body (150) elongated in a backward direction from the water pressure plate; and the other side end of the elastic member (170) is supported by a fixing body (160) separated from the moving body (150) and coupled to the inside of the housing (110).

6. The warm water recirculating valve of claim 5, wherein the water pressure plate (140) is formed in a flange shape configured to protrude to the outside of the moving body (150).

7. The warm water recirculating valve of claim 5, wherein an opening part (118) is formed in one side of the housing (110) so that the valve body (120), the shaft (130), the water pressure plate (140), the moving body (150), the fixing body (160), and the elastic member (170) are inserted into the housing (110).

8. The warm water recirculating valve of claim 1, wherein a pressure (P3) in the recirculating channel (113) is formed to be greater than a pressure (P2) in the connection channel (115) when the warm water is recirculated, and thus the recirculating channel (113) is opened.

9. The warm water recirculating valve of claim 1, wherein a pressure (P1) of the direct water which acts on a rear end surface of the water pressure plate (140) is formed to be greater than a pressure (P2) in the connection channel (115) when the warm water or the direct water is used, and thus the recirculating channel (113) is closed.

* * * * *